Jan. 13, 1948.                G. A. REINHARD                2,434,520
                        ROTARY BRUSH TYPE CONVERTER
                    Filed April 26, 1944          2 Sheets-Sheet 1

INVENTOR
Gustav A. Reinhard
BY John Mahoney
ATTORNEY

Jan. 13, 1948.    G. A. REINHARD    2,434,520
ROTARY BRUSH TYPE CONVERTER
Filed April 26, 1944    2 Sheets-Sheet 2

INVENTOR
Gustav A. Reinhard
BY John Mahoney
ATTORNEY

Patented Jan. 13, 1948

2,434,520

UNITED STATES PATENT OFFICE 2,434,520

ROTARY BRUSH TYPE CONVERTER

Gustav A. Reinhard, Shaker Heights, Ohio

Application April 26, 1944, Serial No. 532,849

5 Claims. (Cl. 171—123)

This invention relates to stationary converters and more particularly to such a converter in which the field is excited by alternating current.

The usual direct current generator, as now constructed, is composed of a stationary member or yoke having a plurality of poles which are energized by field windings to provide a magnetic field, and an armature rotatable in the magnetic field provided with windings in which current is induced during rotation of the armature. In such generators, the field windings are energized by direct current, the armature windings are connected at the desired points to commutator bars which rotate with the armature shaft, and the current generated is conducted from the commutator bars by means of properly spaced stationary brushes. However, it would be of considerable advantage to be able to excite the field by means of alternating current and thus produce a rotating field, but this is not feasible with direct current generators as now constructed. It is therefore necessary in ordinary direct current generators to provide a rotating armature.

In some respects my improved converter is similar to a rotary or synchronous converter. Such converters have field poles, a rotating armature, a commutator rotatable with the armature, a shunt field and usually an interpole field. The commutator bars, however, are subject to centrifugal force and even when care is exercised in constructing, baking and spinning the commutator, some of the bars may be thrown out of alinement by centrifugal force during the rotation of the commutator, thereby causing sparking. In such converters, the bearing, friction and windage losses are also considerable, which materially affects the efficiency of the machine.

It is the aim of the present invention to provide a stationary converter, the field of which is excited by alternating current, and in which the yoke, the armature, and the commutator are all stationary during the operation of the generator. In my improved converter the commutator bars are therefore not subject to centrifugal force and losses due to bearings, friction and windage is eliminated.

Broadly stated, according to my invention, the stator is wound in a manner similar to the stator of an induction motor and is energized by a polyphase alternating current, or a single phase alternating current which may be split by suitable means, such as a condenser, to form a rotating field, and the armature, which is stationary, is arranged interiorly of the rotating field and is provided with windings similar to the armature of the usual direct current generators. Associated with the armature is a stationary commutator, the bars of which are connected to the armature in the same manner as the windings are connected to the commutator bars in the usual direct current generators, and the current induced in the armature windings by the rotating field is conducted from the commutator bars by means of a plurality of properly spaced brushes which bear against the commutator bars and are revolved at the same electrical speed as the rotating field by suitable means, such as a synchronous motor having the same number of main poles as my improved converter. In my improved converter, means are provided to vary the position of the commutator relative to the brushes and I also provide means to counteract the centrifugal force upon the revolving brushes.

It is therefore an object of my invention to provide an improved converter having a stationary stator, a stationary armature, in the windings of which current is induced by means of a rotating field, and stationary commutator bars.

Another object of my invention is to provide an improved converter having a stationary armature in the windings of which current is induced by a rotating field and a stationary commutator upon which brushes are revolved at the same electrical speed as the rotating field.

A further object of my invention is to provide an improved stationary converter having a stationary armature, in the windings of which current is induced by a rotating field, and brushes revolvable upon the commutator bars, including means for varying the position of the commutator relative to the brushes.

A still further object of my invention is to provide an improved converter having a stationary commutator, in the windings of which converter current is induced by a rotating field, and brushes revolvable upon the commutator bars at the same electrical speed as the rotating field, including means for counteracting the centrifugal force upon the brushes during revolution.

My invention will be better understood by reference to the accompanying drawings in which.

Figure 1:
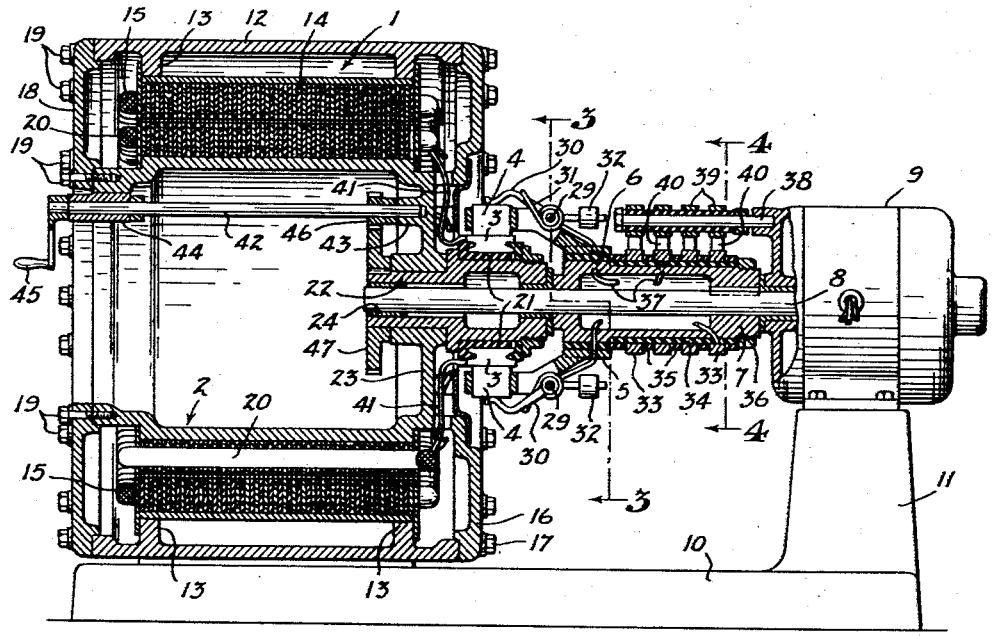
Fig. 1 is a cross sectional view of my improved converter and a side elevational view, with parts broken away, of the synchronous motor for revolving the brushes.
Figure 3:
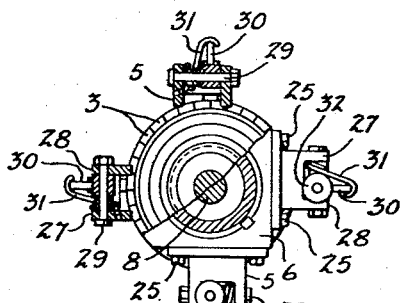
Fig. 3 is partially a sectional view and partially an elevational view taken on a plane through the line 3—3 of Fig. 1, looking in the direction of the arrows.
Figure 4:
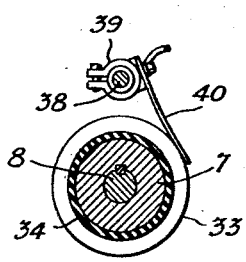
Fig. 4 is a cross sectional view on the line 4—4 of Fig. 1, looking in the direction of the arrows.

While my improved converter may be constructed in various ways, and I do not desire to be limited to the particular arrangement shown, as illustrated in the drawings, it comprises a stator 1, a stationary armature 2, stationary commutator bars 3, and a plurality of brushes 4 slidably mounted in brush holders 5, which holders may be secured in any suitable manner to an insulating casing 6. Insulating casing 6, in turn, is mounted upon a sleeve 7 which is keyed to the shaft 8 of a synchronous motor 9. My improved converter may be supported in any desired manner. As illustrated, it rests upon a base 10 provided at one end with an upwardly extending standard to form a support 11 for the synchronous motor 9.

Figure 2:
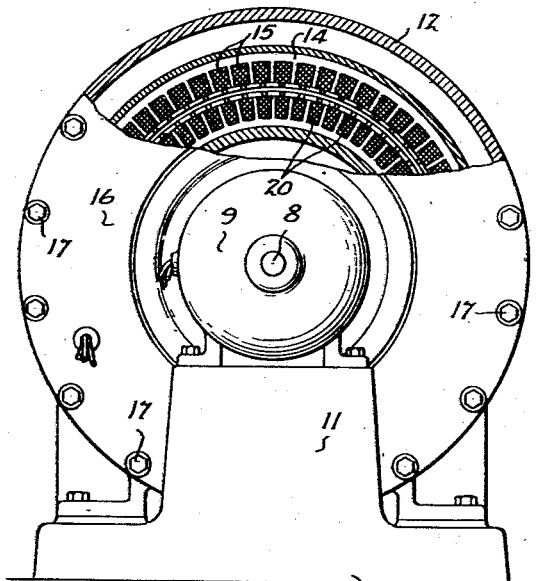
Fig. 2 is an end view of the converter and motor shown in Fig. 1, a portion of the converter being broken away to show the position of the stator and armature windings.

As shown in Figs. 1 and 2 of the drawing, my improved converter includes an outer casing 12 having inwardly extending annular flanges 13 arranged adjacent opposite ends of the casing which support the stator core 14. The stator core 14 is laminated and is provided with a plurality of spaced longitudinal extending semi-enclosed insuldated slots to receive the stator windings 15. The stator windings may be placed in the slots and the ends connected together in the same manner as the stator coils of the usual induction motor. Arranged interiorly of the stator is the stationary armature 2, one end of which is flanged at 16 and is secured to the casing 12 by suitable means, such as bolts 17. A ring is also connected to the opposite ends of the armature and the casing 12 by bolts 19. The armature windings 20 may be of the lap or series type as in ordinary direct current generators and are connected to the commutator bars 3 in the same manner as in direct current generators. As illustrated diagrammatically in Figs. 5 and 6, they are of the series type.

The stationary commutator bars 3 may be arranged in any suitable manner. As illustrated, they are supported upon an insulating ring 21 which in turn is supported upon a sleeve 22 mounted on shaft 8 of motor 9. One end of sleeve 22 extends through a bore on end portion 23 of the armature and suitable bearings 24 are formed interiorly of the sleeve in which shaft 8 rotates.

In my improved converter, means are provided to revolve the brushes at the same electrical speed as the rotating field. For this purpose, the brush holders 5 are affixed to the insulating casing 6 by suitable means, such as screws 25, and the casing in turn is keyed to one end of block 7. The block 7, in turn, is keyed to the shaft of motor 9 and consequently the brushes are revolved at the same speed as shaft 8 of synchronous motor 9.

Suitable means are also provided to maintain the brushes in firm engagement with the commutator bars and to counteract the centrifugal force upon the brushes during rotation. For this purpose, the brush holders are bifurcated to form arms 27 and 28 which are apertured to receive a pintle 29 upon which is pivotally mounted a finger 30 which bears upon the brushes and is held in contact therewith by suitable means, such as a spring 31 wound around pintle 29 with one end bearing upon the finger and the other end anchored in one arm of the brush holder. Spring 31 normally maintains sufficient pressure upon brushes 4 to maintain them in firm engagement with the commutator bars although permitting the brushes to slide upon the bars. However, during rotation, the brushes have the tendency to be thrown outwardly by centrifugal force, and to prevent their outward movement when they are rotated at high speed, finger 30 is provided with a weight 32 which counteracts the centrifugal force upon the brushes.

Figure 5:
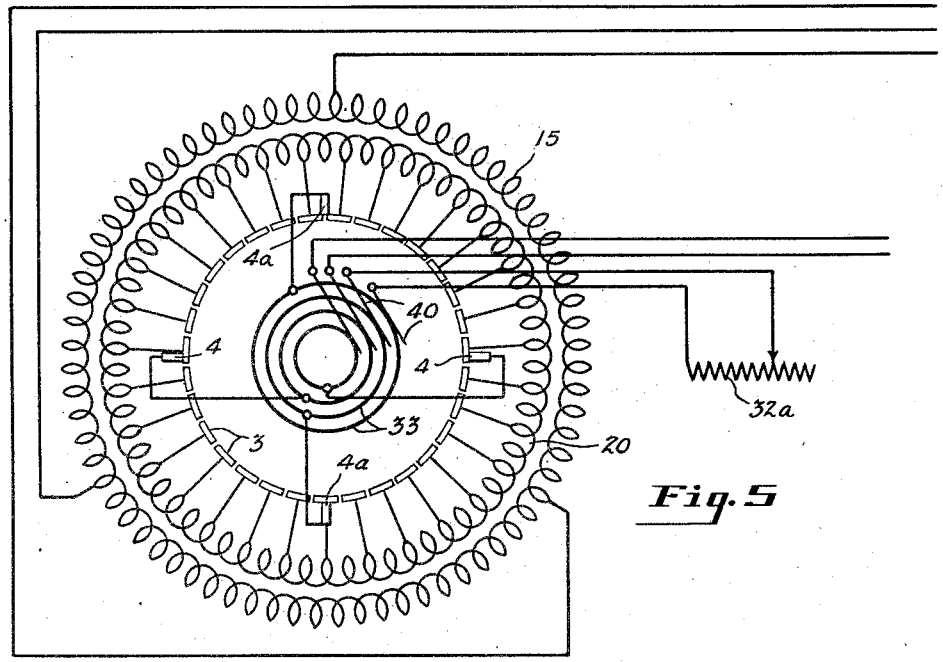
Fig. 5 is a wiring diagram, illustrating diagrammatically my improved converter and showing a three phase alternating current connected to the stator winding to produce a rotating field.
Figure 6:
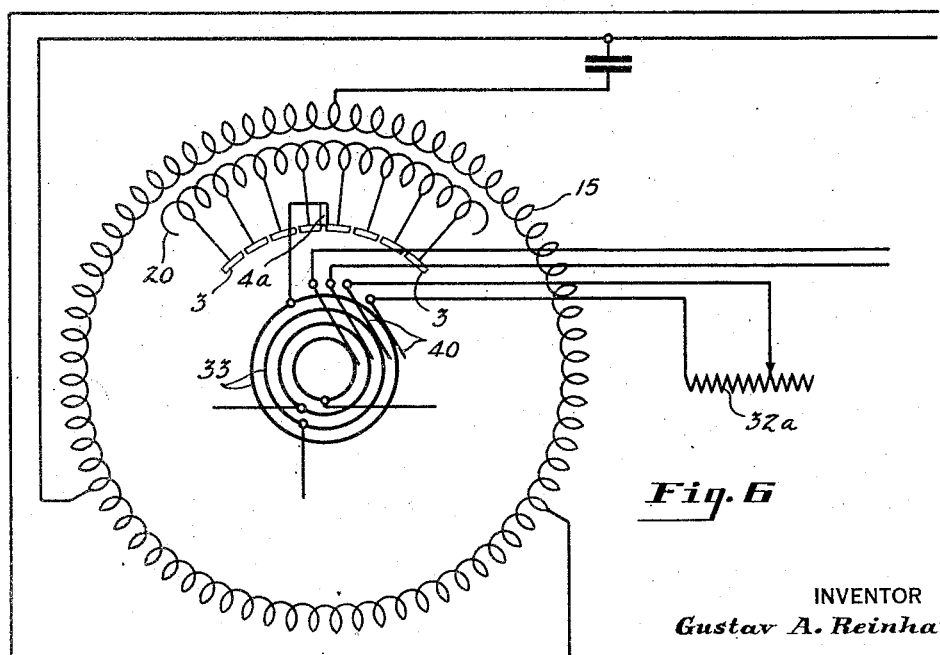
Fig. 6 is a view similar to Fig. 5 showing the stator winding energized by a single phase alternating current provided with a split phase.

While my improved generator may be provided with any suitable number of brushes, as illustrated diagrammatically in Fig. 5, the generator has two main brushes 4 and two compensating brushes 4a. The compensating brushes are for the purpose of counteracting the reactive voltage and to set up a field if the poles tend to shift due to load and power factor. As illustrated in Figs. 5 and 6, the compensating brushes are arranged at ninety degrees from the main brushes and may be short-circuited upon each other or connected through a variable resistor 32a and serve as a means for returning direct current to the system.

The current may be conducted from the brushes in any desirable manner. As illustrated, a plurality of slip rings 33 are mounted upon an insulating sleeve 34 and spacers 35 formed of insulating material separate the rings from each other. Sleeve 34 abuts against an annular projection on sleeve 7 and one of the spacers 35 abuts against casing 6, and sleeve 34 and spacers 35 are held upon the sleeve 7 to rotate therewith by suitable means, such as a nut 36. Current is conducted from each of the brushes by means of a suitable conductor 37 leading to each of the slip rings. As illustrated, the conductors 37 lead from the brushes through suitable apertures to an annular chamber formed between the sleeve 7 and shaft 8 and from thence to the respective slip ring.

Suitable means are also provided to conduct the generated current from the slip rings. As illustrated, a bar 38 is connected to the casing of the synchronous motor upon which are mounted brush holders 39 insulated from the bar and from each other and the current from each slip ring is conducted to its respective brush holder by suitable means, such as a flexible brush 40. one end of which is connected to the brush holder and the other end of which slides upon the slip ring. The connection of each brush to its respective holder also serves as a terminal for the generated current.

I also provide means to change the relative position of the brushes and commutator bars so that the brushes may be correctly positioned relative to the rotating field. The purpose of this is obvious, being the same as brush shifting of any ordinary direct current generator. This may be effected in various ways. For instance, the brush holders may be in the form of a ring rotatable to a limited extent upon the insulating casing 6 when the synchronous motor is at rest or the commutator bars may be rotated to a limited extent relative to the brushes, or the pole centers of the synchronous motor may be shifted with respect to the pole centers of the rotating field of the stationary converter which is equivalent to shifting the brushes or commutator with respect to the rotating field. As illustrated in the drawings, conductors 41 leading from the armature windings to the commutator bars are of sufficient length to permit a limited shifting of the commutator bars relative to the brushes. While this shifting may be effected by any suitable means, as shown, a shaft 42 is provided, one end of which is journalled in a bearing 43 extending from the end portion 23 of the armature and the other end in a bearing 44 affixed to the other end of the armature. Shaft 42 is provided at one end with a handle 45 and has a pinion 46 which meshes with a gear 47 keyed to sleeve 22. Upon rotation of handle 45, it will be apparent that the commutator bars may be shifted to a limited extent relative to the brushes.

In the operation of my improved converter, a rotating electrical field is established in the stator windings by means of a polyphase alternating current which induces current in the armature windings. The armature windings are connected to the commutator bars in the same manner as in the usual direct current generator and a plurality of brushes are provided which are revolved on the commutator bars at exactly the same speed as the rotating electrical field, and consequently the current generated in the armature windings may be conducted from the commutator bars in the same manner as in direct current generators. In my improved converter, however, only the brushes revolve and consequently, there is no structural difficulty and no vibration of the parts, and losses due to bearings, friction and windage are eliminated.

What I claim is:

1. Apparatus of the class described comprising a stationary armature having windings, means providing a rotating field to induce current in said windings, a stationary commutator including bars connected to the armature windings, a plurality of brushes mounted to contact said commutator, means for revolving said brushes at the same electrical speed as the rotating field, said brushes including a pair of main brushes and a pair of compensating brushes with each of the compensating brushes being arranged at ninety electrical degrees from a main brush and said compensating brushes being electrically connected to each other to provide a direct current for setting up poles opposing the shifting of the main poles and for overcoming reactance voltage.

2. Apparatus of the class described comprising a stationary armature having windings, means providing a rotating field to induce current in said windings, a stationary commutator including bars connected to the armature windings, a plurality of brushes mounted to contact said commutator, means for revolving said brushes at the same electrical speed as the rotating field, said brushes including a pair of main brushes and a pair of compensating brushes with each of the compensating brushers being arranged at ninety electrical degrees from a main brush and said compensating brushes being arranged at ninety compensating to each other to provide a direct current for setting up poles opposing the shifting of the main poles and for overcoming reactance voltage, and means for regulating the amount of direct current flowing in the circuit between said compensating brushes.

3. Apparatus of the class described comprising a stator having windings therein, means for energizing said windings to provide a rotating field, a stationary armature having windings arranged interiorly of the stator windings, a sleeve supported by said armature, a drum type commutator mounted on said sleeve having bars electrically connected to the armature windings, a plurality of brushes including a pair of main brushes and a pair of compensating brushes mounted to revolve on said commutator, electric means for revolving said brushes in contact with said commutator at the same electrical speed as said rotating field, resilient means for maintaining said brushes in engagement with said commutator at a substantially constant force at all speeds, means for adjusting the relative position of said commutator and said brushes with respect to the rotating field when the brush driving means is at rest, which means is effective in maintaining said brushes and commutator in adjusted position when the means for driving the motor is energized, and each of said compensating brushes being arranged at ninety electrical degrees from a main brush and being electrically connected to each other to form a circuit for direct current which sets up poles opposing the shifting of the main poles and for overcoming reactance voltage, and means for regulating the amount of direct current which flows in the circuit between said compensating brushes.

4. Apparatus of the class described comprising a stationary armature having windings, means for providing a rotating field to induce current in said windings, a stationary commutator including bars which are electrically connected to the windings of said armature, brushes mounted to contact said commutator bars, electrical means for revolving said brushes to contact said commutator at the same electrical speed as the rotating field, and means for changing the relative positions of said brushes and commutator to correctly position the brushes relative to the rotating field when the means for revolving the brushes to contact the commutator is at rest, the number of bars in said commutator being sufficient to provide a continuous current and the means for changing the relative position of the brushes and commutator being effective in maintaining said brushes and commutator in the adjusted position when the means for revolving the brushes is energized.

5. Apparatus of the class described comprising a stationary armature having windings, means for producing a rotating field to induce current in said windings, a stationary commutator including bars, leads connecting said windings and bars, brushes mounted to contact said commutator bars, electric means for revolving said brushes to contact said commutator at the same electrical speed as the rotating field, means independent of the brush driving means for changing the position of said commutator relative to said brushes to correctly position the brushes relative to the rotating field which means is effective in maintaining said brushes and commutator in the adjusted position when the means for driving the motor is energized, and said leads being of sufficient length to permit movement of the commutator relative to the armature windings.

GUSTAV A. REINHARD.

REFERENCES CITED

The following references are of record in the file of this patent:

UNITED STATES PATENTS

| Number | Name | Date |
|---|---|---|
| 1,354,698 | Shallcross | Oct. 5, 1920 |
| 547,683 | Rowland | Oct. 8, 1895 |
| 572,510 | Hutin et al. | Dec. 1, 1896 |
| 880,705 | Woodbridge | Mar. 3, 1908 |
| 1,003,325 | Blum | Sept. 12, 1911 |
| 1,244,614 | Koppitz | Oct. 30, 1917 |
| 433,758 | Zipernowsky et al. | Aug. 5, 1890 |
| 1,184,460 | Koppitz | May 23, 1916 |
| 1,244,569 | Woodbridge | Oct. 23, 1917 |
| 2,003,056 | Southgate | May 28, 1935 |
| 869,244 | Hubbard | Oct. 29, 1902 |